Figure 1:
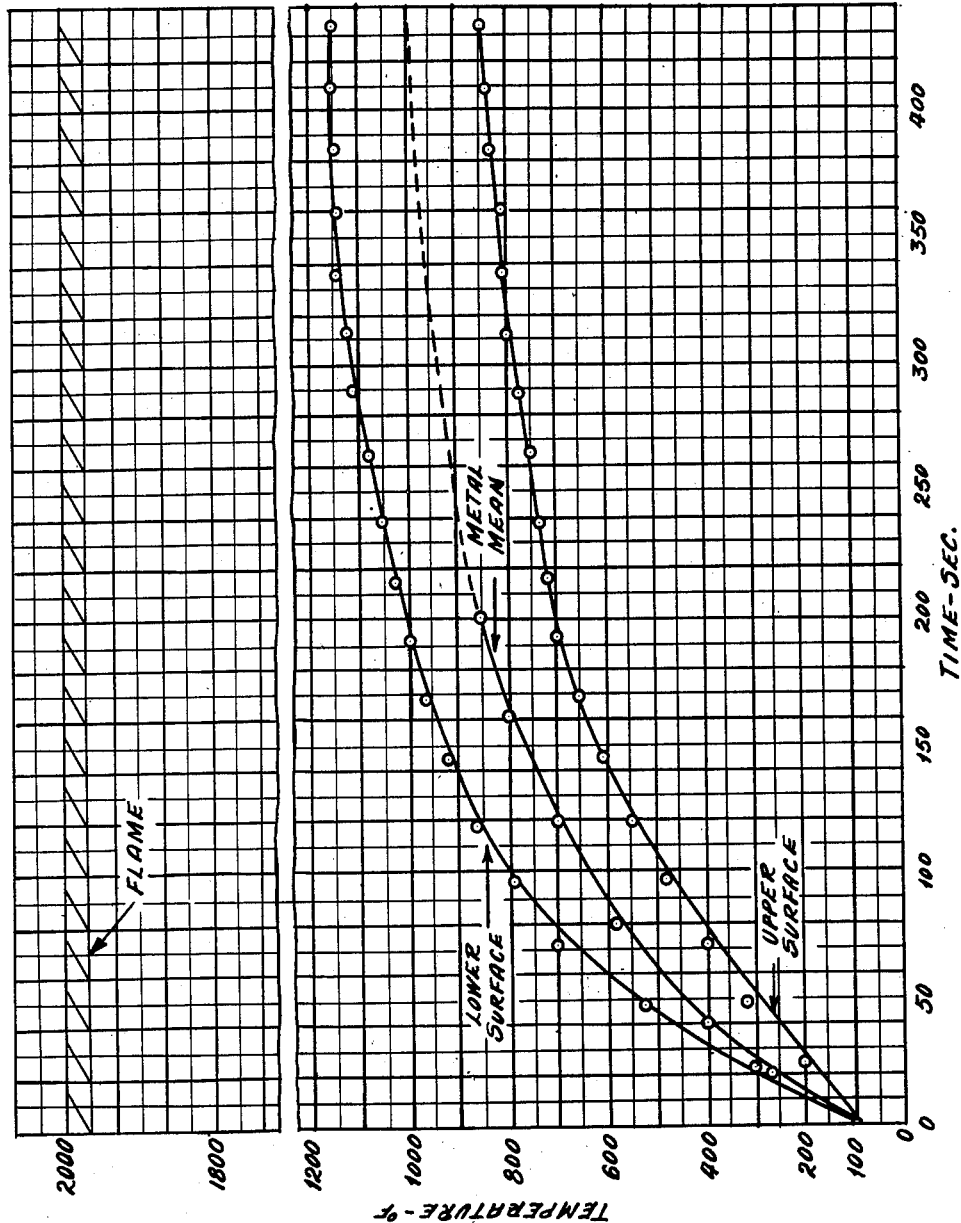

United States Patent Office 3,022,190
Patented Feb. 20, 1962

3,022,190
PROCESS OF AND COMPOSITION FOR
CONTROLLING TEMPERATURES
Rubin Feldman, Creve Coeur, Mo., assignor to The Emerson Electric Manufacturing Company, St. Louis, Mo., a corporation of Missouri
Filed Feb. 15, 1960, Ser. No. 15,007
39 Claims. (Cl. 117—37)

This invention has to do with the dissipation of heat at a high rate and in a closely predetermined range of temperatures. It has particular, but not exclusive application to a method and compositions for controlling the temperature of metal parts subjected to intense heat. This application is a continuation-in-part of my application Serial No. 761,886, filed September 18, 1958, now abandoned.

There are many situations in which it is desirable to provide some means of ensuring for a short time that the temperature of a piece of equipment does not exceed a certain predetermined amount. This can be accomplished in any number of ways, as by jacketing the member and cooling it with liquid, or by making the member massive enough to provide sufficient heat capacity, but frequently these and the other methods known heretofore are impractical.

The process and compositions of this invention are described herein in connection with rockets and missiles, because the application and the virtues of the invention are excellently illustrated in this environment, where low weight and the disposition of large amounts of heat for a short time are of great importance, but it is to be understood that this invention has application to numerous other devices and machines. For example, the composition of this invention can be applied to bearings of machines in which the bearings may on occasion overheat, and can even be applied to such things as chills for molds in certain foundry work and to the underside of pieces being welded to protect the pieces or adjacent material from excessive heat.

One of the chief problems of modern rocket design is the problem of weight reduction. This problem is interrelated with the problem of temperature control in the various components of the rocket. The internal surfaces of rocket motors and motor nozzles are subjected to high pressure and temperature. The body of the rocket, during high speed flights, may also be subjected to high temperatures resulting from aerodynamic heating. The temperature of the adiabatic layer around a missile during a high speed flight may be measured in thousands of degrees Fahrenheit. Structures, instruments and servo mechanisms, as well as hydraulic control mechanisms, must be protected from excessive heat. Most structures lose strength with increasing temperature; for example, aluminum at 500° F. has only twenty percent of its yield strength at room temperature.

In order to overcome the heating problems, the practice heretofore has been to insulate the surface from the high temperatures, where possible; to provide sufficient thickness of metal to compensate for metal strength lost due to high temperatures and to provide a heat sink for the energy absorbed; to use liquid cooling, as by recirculating the fuel in thermally critical areas of the rocket where liquid fuel is used; to employ radiation shields; to utilize ablative materials; and to use transpiration techniques. It has recently been suggested to use a magnetic field, acting on the ionized gas layer at the surface of rockets.

It has also been necessary to use structurally strong but relatively heavy metals. By way of example, the present resonance suppressor in jet assisted takeoff (JATO) units is made of steel, insulated with a relatively heavy coating of heat resistant insulation. If such a unit could be made of aluminum, a 60 to 70% weight reduction could be realized. However, it has heretofore been impossible to use aluminum, because of the high heat involved.

One of the objects of this invention is to provide a process and compositions with which the process can be carried out, whereby, for a limited but substantial time, overheating of a member can be prevented, and the temperature of the member accurately controlled.

Another object is to provide structural materials impregnated with compositions of this invention or into which compositions of this invention are incorporated, to achieve heat resistance and temperature control in and around the materials.

Other objects will become apparent to those skilled in the art in the light of the following disclosure and accompanying drawing.

In accordance with this invention, generally stated, a process of controlling temperature is provided which involves the coating of, impregnating of, or incorporating the substance of structural members with, sublimating compositions, and subsequently causing the sublimating composition to sublime. The process of this invention does not merely utilize the latent heat of sublimation of the sublimating compositions. The thermal protecting and heat controlling characteristics of the compositions of this invention, when used in the process of this invention, are of a wholly different order of magnitude from those which could be expected from mere utilization of the latent heat of sublimation.

As has been indicated, the sublimating compositions of this invention may be used as coatings, or they may be used to impregnate porous materials, or they may be incorporated with other materials to form a structural material with "built-in" temperature control characteristics, or in various combinations of these forms.

When used as coating compositions, the sublimating compositions of this invention can be brushed or sprayed in a thin coat on metal surfaces to be exposed to high temperatures. They serve as insulating media until the temperature of sublimation is reached, when, sublimating, they act as large heat sinks. This is particularly advantageous when the compositions are applied to the side of the part contiguous the source of heat, as for example, the surface of a rocket motor nozzle which is exposed to the flame from the propellant. In such an application, the insulating qualities of the coating (equivalent to that of aluminum oxide or fiberglass) reduces the amount of sublimating composition needed. When the coating is applied to the "no-flame" side of a part, the coating (or the coated medium itself) should be sufficiently porous to allow the escape of gaseous products from the surface of the part, at which sublimation will begin.

The useful application of the compositions of this invention is not restricted to areas of extremely high temperatures. Certain of them may be used in environments in which a water jacket might be used. With the compositions of this invention, no "jacket" is required.

The compositions of this invention are easy to prepare and apply, and bond well to properly cleaned metal. Most are stable even under conditions of high humidity, and the ones which tend to be hygroscopic can be protected by a water-impervious coating.

The sublimating compositions of this invention can also be applied in a thick coat on surfaces to be exposed to high temperatures, but in that event, particularly if they are applied to the no-flame side of a part, the coating is preferably applied in discrete areas. This can be accomplished, for example, by applying the coatings with a kind of silk screen process, so that the coating is in the form of small squares, separated by a small gap from one another or, in heavier coats on large areas, by applying a continuous coat and then cutting grooves in two directions, to form, for instance, one inch squares. This arrangement not only permits the escape of gases, but accommodates the difference in thermal expansion of the material to which the coating is applied, and the coating itself. By way of illustration, a thick coating might be from 20 mils to an inch or more in thickness. In the very heavy coatings, the composition is preferably mechanically reinforced.

The problem of obtaining uniform distribution of heat through the coating, and of dissipating heat, especially when the coating, which acts as an insulator, is applied to the no-flame side, is solved to some extent by incorporating with the sublimating compositions, heat transferring materials, such as graphite, or metal filings or powder.

Another embodiment of this invention involves the impregnation of porous materials with sublimating compositions. For example, parts made of powdered metal are commonly made which will permit the diffusion of gases through them. Sublimating compositions of this invention may be converted into gaseous form and drawn into or forced into the pores of such metal parts, where the gaseous material condenses, impregnating the pores with solid sublimating material. Certain of the sublimating compositions of this invention can be dissolved in volatile liquid. The solution may then be pulled or forced into the pores of the powdered metal part, which is heated, so that as the solution goes in, the solvent is evaporated in the pores, depositing the solid sublimating compositions therein. The effectiveness of these impregnated porous materials is enhanced by what is described hereafter as transpiration cooling. They may be used for leading edges of "aircraft" surfaces, for housing for electronic equipment in rockets and other aircraft, and similar areas in which severe heating problems are encountered.

A related kind of impregnation may be used in producing a laminate structure. Fiberglass cloth, for example, can be "saturated" with a solution of sublimate. The solution can be evaporated to leave the solid material in the interstices of the cloth. The cloth can then either be used as it is, or can be laminated with other materials.

Still another embodiment of this invention involves the incorporating of sublimating compositions into refractories. This can be done by simply mixing the sublimate and the refractory material together, with a suitable binder, and forming shapes from the resultant mixture, at a heat less than the heat of sublimation of the sublimate material. Graphite is an example of a suitable refractory material.

The term "applying" is used hereinafter in the claims to embrace coating, impregnation and incorporation.

The term "sublimation" is used herein to indicate a process by which a substance changes its state from solid into vapor without going through the liquid state. The amount of heat energy required for this change of state is called the latent heat of sublimation. The temperature at which this change of state occurs is called the temperature of sublimation. The sublimation of the compositions of this invention should be contrasted with the decomposition of certain of the insulating materials which have been used heretofore. For example, Teflon (polymerized tetrafluoroethylene), which is used as an insulator, undergoes a first order chemical reaction when strongly heated. Such a material cannot be used to give the nicety of control of temperature of which the compositions of the present invention are capable because, depending upon the rate of heat flux, the temperature attained by the Teflon during this reaction may vary from about 540° F. to over 1000° F.

While the theory of its operation forms no part of this invention, it is believed that the unexpected efficacy of the process and compositions of this invention arises from a number of different factors. The latent heat of sublimation is one of the factors. Still another is the heat capacity of the gases which are formed in the course of sublimation. From the point of view of protection, the gas boundary-layer which is formed is of great importance as an insulating material. Transpiration, the cooling effect of gases squeezing through a porous matrix, is still another factor. In any event, the protective and cooling effects of the process and compositions of this invention greatly exceed what might be expected from a consideration of the heat of sublimation.

The sublimating materials set forth as examples herein are chiefly inorganic. If organic sublimates are used, it must be determined that at the range of temperatures and under the conditions to which they are to be subjected, they sublime, and do not simply decompose. The following examples are illustrative of the compositions of this invention. They are not all of equal efficacy, but they are all operative. The compositions of Examples 7 and 8 have been found particularly useful.

*Example 1*

| | Parts by weight |
|---|---|
| Chromium trichloride (green) $CrCl_3 6H_2O$ | 80 |
| Mercuric sulfide (red) $HgS$ | 15 |
| Phosphorus pentoxide $P_2O_5$ | 2 |
| Sodium silicate (binder) | 1.5–30 |

All of the ingredients are mixed together thoroughly, and then dissolved in 60% methyl alcohol, the amount used being dependent upon the viscosity desired of the coating composition. Alternatively, the dry ingredients can be dissolved in water, with heating. The preferred range of binder is from 10 to 30 parts by weight.

After a surface has been coated with this composition, and dried, a coat of moisture inhibitor, such as beeswax, in amount of about 1.5 parts by weight of the dry coating is applied.

*Example 2*

| | Parts by weight |
|---|---|
| Chromium trichloride (green) | 20 |
| Mercuric sulfide (red) | 75 |
| Phosphorus pentoxide | 2 |
| Copper oxyphosphate (binder) | 1.5–30 |

The composition of this example may be formulated in the same way as the composition of Example 1. The preferred range of binder is from 10 to 30 parts by weight.

*Example 3*

| | Parts by weight |
|---|---|
| Chromium trichloride (green) | 10 |
| Mercuric sulfide | 10 |
| Ammonium chloride $NH_4Cl$ | 75 |
| Phosphorus pentoxide | 2 |
| Sodium silicate (binder) | 1.5–30 |

The composition of this example may be formulated in the same way as the composition of Example 1.

*Example 4*

| | Parts by weight |
|---|---|
| Chromium trichloride (green) | 75 |
| Ammonium chloride | 15 |
| Mercuric sulfide (red) | 5 |
| Copper oxyphosphate (binder) | 1.5–30 |
| Phosphorus pentoxide | 2 |

The composition of this example may be formulated in the same way as the composition of Example 1.

*Example 5*

| | Parts by weight |
|---|---|
| Chromium trichloride (green) | 95 |
| Phosphorus pentoxide | 2 |
| Sodium silicate (binder) | 1.5–30 |

The composition of this example may be formulated in the same way as the composition of Example 1.

*Example 6*

| | Parts by weight |
|---|---|
| Molybdenum hexacarbonyl | 80 |
| Resorcinal-phenol-formaldehyde resin (mol ratio approx. 0.7/0.3/0.6) (binder) | 14⅔ |
| Paraformaldehyde with inert filler (accelerator) | 2⅓ |
| Shredded nylon | 2 |
| Graphite | 1 |
| Ethyl alcohol (vehicle), to desired consistency. | |

The amount of paraformaldehyde in the accelerator is sufficient so that on an over all basis the resin-accelerator composition upon curing contains 1½ to 2 mols formaldehyde per mol of phenol. Such resins and accelerators are commonly sold in commerce, and they, and their use, are well known.

The composition of Example 6 may conveniently be made up by dividing the ingredients, except for the resin and accelerator, into two parts. One of the parts is thoroughly mixed with the resin; the other part, is thoroughly mixed with the accelerator, and two batches are kept separate until the composition is to be applied. When the composition is to be applied, the two batches are thoroughly mixed, and applied in any suitable manner, as by brushing or spraying. The composition can be permitted to air dry and cure at room temperature, or it can be subjected to a mild heating, but, since the effective temperature of sublimation of this composition is approximately 230° F., the heating must be carefully regulated to remain well below that temperature.

It is to be noted that in Example 6, 2% of shredded nylon and 1% of graphite are used. The graphite is introduced to reduce the thermal gradient across the coating. It may be used with any of the compositions of this invention, and, in those compositions in which no reaction develops as a result of their use, metal, such as aluminum or copper powder or flakes may also be used, to conduct heat through the coating. The nylon is used as a bodying agent. Other materials, such as glass fibers or asbestos, preferably about ⅟₃₂ to ⅟₁₆ of an inch long, may be used in place of the nylon.

*Example 7*

| | Parts by weight |
|---|---|
| Molybdenum hexacarbonyl | 65 |
| Resorcinol-phenol-formaldehyde resin (mol ratio approx. 0.7/0.3/0.6) (binder) | 16⅔ |
| Paraformaldehyde with inert filler (accelerator) | 3⅓ |
| Shredded nylon | 2 |
| Graphite or metal powder | 10 |
| Bentonite | 3 |
| Ethyl alcohol (vehicle), to desired consistency. | |

The composition of Example 7 may be compounded and applied in the same way as the composition of Example 6.

*Example 8*

| | Parts by weight |
|---|---|
| Ammonium fluoroborate | 71 |
| Phenol-formaldehyde, one-stage resin (formaldehyde-phenol mol ratio approx. 1.5–3.0/1) | 25 |
| Shredded fiberglass | 3 |
| Graphite | 1 |
| Ethyl alcohol (vehicle), to desired consistency. | |

In compounding the composition of Example 8, the various ingredients are simply thoroughly mixed, with sufficient ethyl alcohol to give the desired consistency for the particular mode of application and thickness of coating desired. Since the effective temperature of sublimation of the composition of Example 8 is in excess of 400° F., the resin used is a heat-curing thermosetting resin. As an example of the application of the composition of Example 8, successive coats 10 to 15 mils in thickness are dried at 140° F., to drive off the ethyl alcohol vehicle. When the desired thickness has been built up, the coating is heated progressively from 140° to a minimum of 200°, and preferably to about 240° F. until the resin is cured.

*Example 9*

| | Parts by weight |
|---|---|
| $MoO_3$ | 66 |
| Phenol-formaldehyde, one-stage resin (formaldehyde-phenol mol ratio approx. 1.5–3.0/1) | 30 |
| Shredded nylon | 3 |
| Graphite or metal powder | 1 |
| Ethyl alcohol (vehicle), to desired consistency. | |

The composition of Example 9 may be compounded and applied in the same manner as the composition of Example 8.

Any other suitable vehicle may be used in lieu of the ethyl alcohol given as the vehicle in Examples 6 through 9. The only requirements for such vehicles are that they do not react undesirably with the ingredients of the composition, and that they evaporate at temperatures and under conditions to which the other ingredients can safely be subjected without destroying their usefulness.

*Example 10*

An example of the impregnation of porous materials with a sublimating composition is as follows:

Ammonium fluoroborate, which sublimes at about 450° F. is put in an Erlenmeyer flask. A porous disk of powdered and sintered steel (50% porosity), about a quarter of an inch thick and three inches in diameter, is put into sealing relation with the mouth of the Erlenmeyer flask on its lower, flat side and with a chamber connected to a vacuum pump or aspirator on its upper flat side. The flask is put on an element of a hot plate which is at about 1000° F., and the sides of the flask are heated with heat lamps to avoid condensation of the sublimed material on the sides of the flask. The temperature of the disk is monitored with thermocouples and regulated by heat lamps. The temperature of the bottom surface of the disk is initially kept around 500° F. somewhat above the temperature of sublimation of the ammonium fluoroborate, and the temperature of the top surface is kept around 440° F., slightly below the temperature of sublimation of the ammonium fluoroborate. A vacuum of two or three inches of mercury is applied to the top surface of the plate. Over a period of about half an hour, the temperature of the bottom surface of the disk is decreased to around 440° F., the same temperature as that of the top surface. The heating is then discontinued, the vacuum is released, and the disk cooled and removed from the apparatus. Using this method of impregnation, approximately 80% of theoretically complete saturation is obtained.

*Example 11*

Another illustration of a method of impregnation of porous material is as follows:

Ammonium thiosulfate, ground to pass through a 400 mesh screen, is suspended in acetone. A disk, such as the disk of Example 7, is put in sealing relation along its lower surface, with a vacuum flask, and is provided with a suitable dam about its circumference, to permit the flooding of the top surface of the disk with the slurry. The disk is heated to 290° F. by means of heat lamps, and a vacuum of two to three inches of mercury is applied to the underside of the disk. After approximately half an hour, the vacuum is released, the slurry and dam removed and the disk cooled, and its surface cleaned. With a slurry containing 30% by weight of solids, a saturation of 60% of the theoretically possible complete impregnation (by weight of solids) is obtained.

It can be seen that in the process of Examples 10 and 11, the impregnation could be accomplished or aided by the use of superatmospheric pressure on the gas, slurry, or solution.

In any of the porous material examples, other powdered metals can be used, such, for example, aluminum or brass. The sintered or pressed metal preferably has a porosity of between 30 and 50%.

*Example 12*

As an example of a moderately heavy coating, a coating of composition of Example 7 approximately 150 mils thick, was applied to a plate by spraying, in successive layers, each 15–20 mils thick. Each successive layer was air dried before the next layer was applied. The full 150 mil thick coat was then given a final baking at 140° F.

*Example 12A*

As another example of a moderately heavy coating, a coating of composition of Example 8 approximately 150 mils thick was applied to a flat plate in the same way as the coating of Example 12. The full 150 mil thick coat was then cured by baking at 240° F.

*Example 13*

As an example of a heavy coating, a coating of composition of Example 8, approximately one and one-half inches thick, was applied to the outer surface of a steel cone, by alternately dipping and spraying, in successive layers, each 15–20 mils thick. Each layer was air dried before the next layer was applied. At each successive 150 mils of thickness, the coating was "netted" with nylon thread, to produce a physical reinforcement. The full one and one-half inch thick coat was then cured by baking at 240° F. The cured coating was machined and stood up well under the machining operation.

*Example 14*

An example of a woven fabric impregnated with sublimate is as follows:

A piece of fiberglass cloth is dipped in a slurry of the composition of Example 8, and dried. This fabric can be used as is, as a heat barrier, or it can be laminated with other fabrics or with rigid materials, to serve as reinforcing. Several sublimate impregnated fabrics or rigid materials, or both, may be laminated.

The part to be cooled can serve as one of the laminae. The laminations can be bonded by any suitable material, such as phenolic or epoxy resins. These materials can also be used as binders in the compounding of other sublimating material. Their usefulness in any particular application is determined by their cure temperature. If the sublimating composition has an effective temperature of sublimation which is low, the cure temperature of the resins or other binders must be low.

The kind of fabric which is used also depends upon the temperature of sublimation of the composition with which it is impregnated. Thus, for a high temperature of sublimation, an asbestos cloth or non-woven sheet may be used, while for a composition with a low temperature of sublimation, nylon, cotton and other materials with a low thermal stability may be used.

In either the impregnated porous materials, or the laminated materials, it may be desirable to use a supplemental coating. For example, a porous metal, impregnated with sublimate, may be coated on the flame side, the no flame side, or both, with a sublimating composition. On the no flame side, the coating of sublimate may be itself coated with an epoxy or other relatively impervious coating. When the porous material is then heated, the sublimate on the flame side will be used up first, then the sublimate in the pores of the material itself, and lastly the sublimate on the no flame side, the gaseous products of which will be forced, by the impervious layer on the outside, to pass through the porous material, thus increasing the transpiration cooling of the porous material.

Any of the sublimating compounds may be dissolved or slurried in various solvents or vehicles other than those given in the examples, such, for example, as propanol, isopropanol, acetone, or the like. Suitable solvents and vehicles will be immediately apparent to those skilled in the art, since their only requisites are that they be unreactive with the other ingredients and, preferably, non-toxic. The amount used, and the viscosity and boiling point to be selected are determined by the use to which they are to be put. The use of methyl or ethyl alcohol or other low-boiling solvents facilitates drying.

Figure 2:
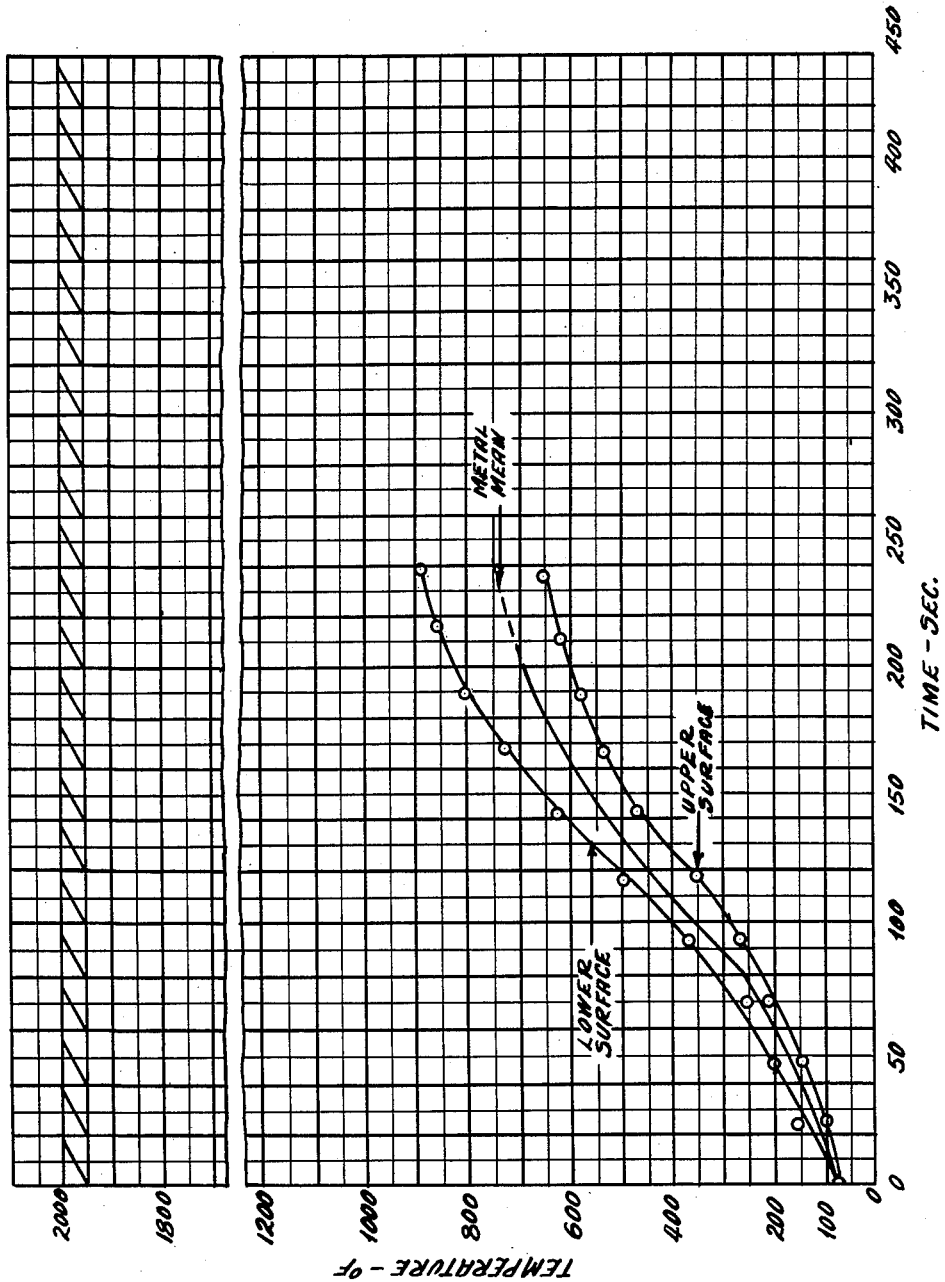
Figure 3:
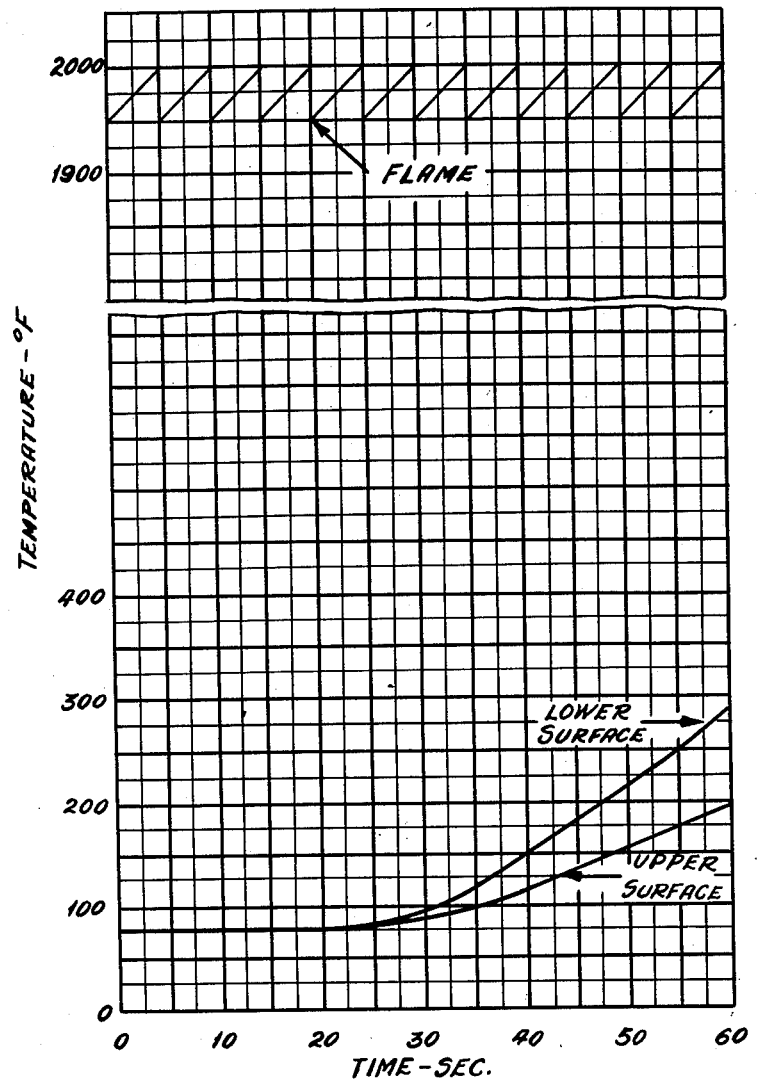
Figure 4:
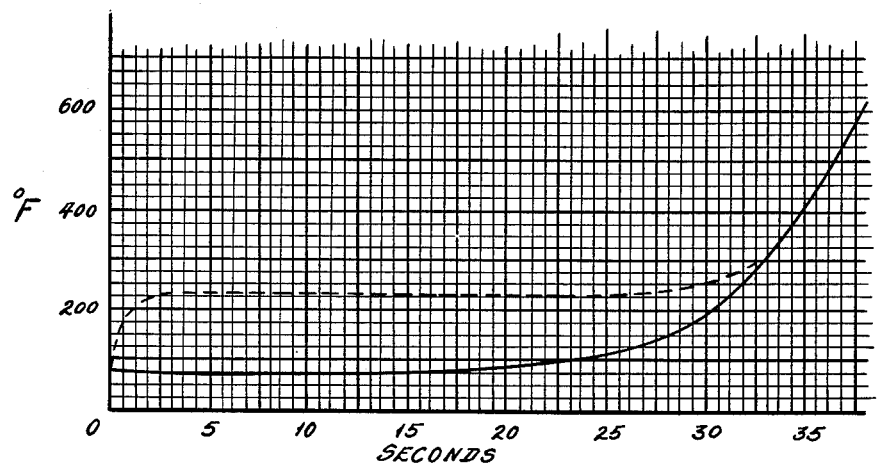
Figure 5:
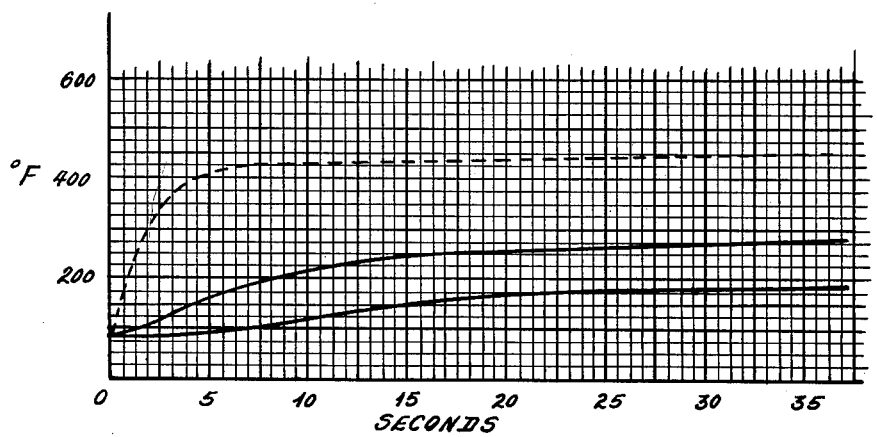

In the drawings FIGURES 1–3 are graphs illustrating the results of early and comparatively crude tests of the efficacy of the composition of Example 1. The same tests with comparable results, were also run with the compositions of Examples 2 and 3. FIGURES 4 and 5 are graphs illustrating the results of later, more refined tests, using the compositions of Examples 7 and 8.

The graphs of FIGURES 1–3, show the rate of temperature rise of a bare plate (FIG. 1), a plate to which the sublimating composition of Example 1 has been applied to the "no-flame" side (FIG. 2), and a plate to which the sublimating composition of Example 1 has been applied to the "flame" side (FIG. 3).

In the tests, the results of which are reflected in FIGURES 1–3, three identical steel plates, each 6" x 6" x ⅛" were used. Chormel-Alumel thermocouples were mounted on the upper and lower surfaces of the plate. An air-gas torch was used as the source of high temperature, and a thermocouple, mounted directly beneath the plate, and exposed to the flame of the torch, was used to measure flame temperature.

The sublimating composition of Example 1 was dissolved in 60% methyl alcohol, and applied, in a thin coat, with a brush to two of the steel test plates. When the first coat was partially dry, another thin coating was applied at a direction at right angles to the first. The total thickness of the sublimate layers was maintained at approximately 1⁄32 of an inch, and the weight, approximately 60 grams per square foot. After the full coating was applied, the coated plate was oven cured for two hours at a temperature of 130° F.

The thermocouples were connected with a temperature-time recording device. Each of the plates was heated in the same way, and the flame temperature in each case was maintained constant within a range of 50° F., as indicated on the graphs, FIGURES 1–3. In the test the results of which are shown graphically in FIGURE 2, the sublimate was applied to the upper, "no-flame" side of the plate, i.e. on the side opposite the one on which the flame played. In the test the results of which are shown in FIGURE 3, the sublimate was applied to the lower, "flame" side, on which the flame played.

In the case of the bare plate, FIG. 1, it can be seen that in the first 20 seconds of exposure, the lower surface of the bare plate was heated to about 300° F., the upper surface, to about 175° F. In 100 seconds, the temperature of the lower surface was 800° F., the temperature of the upper surface, about 475° F., and the mean metal temperature was approximately 650° F.

In the case of the plate coated on the "no-flame" side with the sublimating composition of Example 1, after 20 seconds, the temperature of the lower surface of the plate was approximately 125° F., the temperature of the upper surface was 100° F. After 100 seconds, the temperature of the lower surface was 400° F., that of the upper surface approximately 290° F., and the mean metal temperature was approximately 350° F.

In the case of the plate coated on the lower (flame)

side, the temperature of both the upper and lower side after 20 seconds was 80° F., room temperature. As can be observed from FIGURE 3, after about 37 seconds, the coating of sublimating composition was gone and the plate began to heat in the same way that the bare plate heated.

Tests were run with plates coated with sublimating compositions of Examples 2 and 3, the tests being in all other respects identical with the conditions described in the running of the tests with the compositions of Example 1.

The temperature of the plate coated with composition of Example 2 on the no-flame side had a temperature on its lower surface of about 225° F., and on its upper surface of approximately 140° F., after 20 seconds. At the end of 100 seconds, the plate had a temperature on its lower surface of 700° F., and on its upper surface of 320° F., with a mean metal temperature of about 490° F. at that time. The sublimating composition of Example 2, applied to the flame side, maintained a room temperature of both surfaces for about 18 seconds, after which the sublimating composition had been removed.

The temperature of the lower surface of the plate to which the sublimating composition of Example 3 had been applied to the no-flame side, after 20 seconds was about 130° F., that of its upper surface was about 110° F. After 100 seconds, the temperature of the lower surface was approximately 520° F. and that of the upper surface 475° F., with a mean metal temperature of about 490° F. Applied to the flame side, the sublimating composition of Example 3 maintained room temperature on both surfaces for about 20 seconds, after which the sublimating composition was evidently gone.

The graphs of FIGURES 4 and 5 illustrate the results of later, more refined tests, involving the composition of Examples 7 (FIG. 4) and 8 (FIG. 5).

In these tests, plates were successively mounted on a special fixture which permitted the plate to be moved into the exhaust wake of an ethylene air jet. The exhaust wake exerted a force of Mach 2, and a stagnation temperature of 2000° F. The angle of attack was 22½°, and the sample plate was positioned with its center five or six inches from the mouth of the jet nozzle.

In the test represented by FIGURE 4, a fiber laminate plate, 6" x 6" x 0.145" was coated on one side to a final, cured thickness of .145", with the composition of Example 7. A thermocouple was embedded, at the time the coating was applied, at the interface between the coating and the surface of the plate. When the exhaust wake reached a level condition, the fixture and plate were moved into position with the coated side of the plate directly in the exhaust wake. At the end of 20 seconds, all of the coating had eroded or sublimed from the plate. The temperature at the surface of the plate immediately beneath the coating, during the course of the test, is shown in the solid line in the figure. The estimated surface temperature (temperature of sublimation) is shown in the dotted line.

In the test represented by the graph of FIGURE 5, a steel plate 6" x 6" x 0.120" was coated on one side, to a final, cured thickness of 0.150" with the composition of Example 8. One thermocouple was imbedded, at the time the coating was applied, at the interface between the coating and the surface of the plate, and another thermocouple was attached to the under, uncoated surface of the plate. When the exhaust wake of the ethylene air jet reached a level condition, the fixture and plate were moved into position with the coated side of the plate directly in the exhaust wake.

At the end of thirty seconds, the coating had eroded and sublimed to a thickness of 0.050". The temperature at the surface of the plate immediately beneath the coating, during the course of the test, is shown in the upper solid line in the figure. The temperature at the under surface of the plate during the course of the test is shown in the lower solid line. The estimated surface temperature (temperature of sublimation) is shown in the dotted line.

The greater loss of coating from the test panel used in the test represented by FIGURE 4 over the loss of coating from the FIGURE 5 test panel is believed to have been to some extent a matter of erosion. The material used in the former test was softer and less dense than that used in the latter test.

Vibration tests, with frequencies of 0 to 100 cycles per second and amplitudes providing acceleration of 0 to 30 g (normal gravitational force) were run over a temperature range of minus 40° to plus 140° F. The coatings of sublimating compositions were also tested to determine their moisture-resisting properties. They were tested for a period of ten days in a humidity chamber held at 100% humidity. The chamber temperature was maintained at 103° F. for a period of 8 hours each day. At the end of eight hours, the temperature was allowed to gradually drop to room temperature for 16 hours, with the 100% humidity maintained at all times. The plates were weighed each day, and their respective weights were recorded. These tests indicated that the coatings are unaffected by normal temperature variations and normal humidity variations. They are not affected by vibrations of 100 cycles per second at 30 g in thermal environments varying from minus 40° F. to 140° F.

The sublimating compositions of this invention are non-combustible prior to their sublimation, easily manufactured, easily applied and cured, and serve as insulators. They are safe in handling, although, if they are sprayed on the surface to be protected, the person spraying it should be protected from the mist by proper ventilation or respirators. In the case of some of the sublimates, the gaseous, sublimed composition may decompose and produce combustible products. In the case of molybdenum hexacarbonyl, for example, carbon monoxide is produced, which will burn if oxygen is available to it.

It will be observed that the compositions of this invention are made up of sublimating materials the temperature of sublimation of which varies. Thus, in Example 1, chromium trichloride has a temperature of sublimation of about 181° F.; mercuric sulfide (red), about 1076° F.; phosphorus pentoxide, 482° F. The "effective" maximum sublimating temperature of the composition is around 600° F. In Example 2, the predominance of mercuric sulfide (red), with its high sublimating temperature, makes the effective maximum sublimating temperature of the composition around 880° F. In Example 3, the ammonium chloride has a sublimating temperature of about 635° F., but the composition has an effective maximum temperature of sublimation of about 750° F. The effective maximum temperature of sublimation of the composition of Example 4 is around 450° F.; that of the composition of Example 5, around 200° F. The composition of Example 6 has an effective temperature of sublimation of about 230° F. Although the composition of Example 7 has the same sublimation temperature as that of Example 6, its coefficient of thermal conductivity has been increased by the addition of graphite powder, to permit its use for jacketing purposes. The effective temperature of sublimation of the composition of Example 8 is 450° F., and that of Example 9, 1450° F.

The thickness of the coating determines the length of time for which a given coating will be effective at a given temperature at which sublimation of the coating occurs. A thick coating poses no particular problem when the coating is applied to the "flame" or "source" side, i.e., where the sublimation occurs at the outer, exposed surface of the coating, but does make it desirable to use a porous or patterned coat, or to provide conductive material extending into or through the coat when a heavy coat is on the "no-flame" or "shielded" side.

Other sublimating materials may be substituted for one or more of the sublimating compounds of the compositions of the examples, although, as will be evident to those skilled in the art, some alternative compounds will have certain disadvantages, in producing irritating or toxic vapors, corroding metal, having a lesser latent heat of sublimation, or the like. Examples of possible substituents include—

| Compound: | Temperature of sublimation ° F. |
|---|---|
| Iodine bromide | 122.0 |
| Ammonium carbamate | 140.0 |
| Ammonium hydrosulfide | 248.0 |
| Mercurous iodide | 284.0 |
| Ammonium benzoate | 320.0 |
| Ammonium sulfite | 302.0 |
| Nitrogen sulfide | 275.0 |
| Phosphorous pentachloride | 320.0 |
| Phosphorus tetraoxide | 356.0 |
| Mercurous bromide | 653.0 |
| Selenium dioxide | 602.6 |
| Potassium amide | 752.0 |
| Mercuric sulfite (black) | 834.8 |
| Beryllium bromide | 842.0 |
| Ammonium iodide | 1023.8 |

As an example of a practical application of the process and compositions of this invention, an aluminum resonance suppressor, coated with the composition of Example 1, was used, in place of the usual insulator protected steel suppressor in a JATO unit motor. The pressure and thrust records of this test, indicated a complete reproduction of conditions produced under similar burning using the customary insulator coated steel suppressor. The use of the aluminum suppressor, coated with the sublimate composition of this invention demonstrated the feasibility of a 60 to 70% weight reduction over the steel suppressor.

The applicability of the process and compositions of this invention to re-entrant nose cones and the like, is clear.

In the embodiment of this invention in which the sublimate is incorporated into a refractory, the resultant material may be used to form nozzle or throat inserts for rockets, among other things. An interesting application of the composition of this invention, whether in the form of refractories, impregnated fiberglass cloth or other fabric, or in the form of coated sheets, is in a pneumatic servo mechanism system, in a rocket, in which the propellent gases are utilized to operate the mechanism. In such a system, a fin type heat exchanger can be provided in which the fins are either metal plates coated with sublimate composition or members made up with the sublimate composition as a part thereof. The heat exchanger can be positioned between the lead off port from the propellant gas passage and the servo mechanism, and serves not only to cool the gases, but to augment the propellant gases.

Numerous variations in the compositions, and in the applications of the process of this invention, within the scope of the appended claims, will become apparent to those skilled in the art in the light of the foregoing disclosure.

Thus it can be seen that a process and compositions are provided by which temperatures can be controlled easily and effectively, even under extremely severe conditions.

Having thus described the invention, what is claimed and desired to be secured by Letters Patent is:

1. The process of maintaining the temperature below a predetermined level, of at least part of an element subjected to temperatures above said predetermined level, for a short, predetermined maximum length of time, comprising applying, to the area of said element in which the said lower temperature is to be maintained, sublimating composition having an effective temperature of sublimation, at the pressure to which the said element is to be exposed when it is subjected to temperatures above the predetermined level, below the said temperature level but above the initial temperature of said element, in an amount sufficient to ensure incomplete exhaustion of said sublimating composition during said predetermined length of time, and thereafter subjecting said area to temperatures above said temperature level.

2. The process of protecting an element from a source of excessive heat for a limited time, said element having a flame side and a no-flame side, comprising coating said element with a sublimating composition having an effective temperature of sublimation, at the pressure to which the element may be exposed when the sublimating composition is utilized as a temperature control means, no higher than a predetermined maximum to which the said element may be raised, subsequently applying heat from said source to said flame side, causing said sublimating composition to sublime, and forming an insulating boundary layer of gaseous sublimed material between the source of said heat and said flame side of said element.

3. The process of protecting an element from a source of excessive heat for a limited time, said element having a flame side and a no-flame side, comprising coating said element with a sublimating composition having an effective temperature of sublimation, at the pressure to which the element may be exposed when the sublimating composition is utilized as a temperature control means, no higher than a predetermined maximum to which said element may be raised, subsequently applying heat to said flame side from said source, causing said sublimating composition to sublime, forming an insulating boundary layer of gaseous sublimed material between the source and said flame side and subsequently decomposing at least a part of said gas.

4. The process of protecting an element from a source of excessive heat for a limited time, said element having a flame side and a no-flame side, comprising coating said flame side with a sublimating composition having an effective temperature of sublimation, at the pressure to which the element may be exposed when the sublimating composition is utilized as a temperature control means, no higher than a predetermined maximum to which the said element may be raised, subsequently applying heat from said source to said flame side, causing said sublimating composition to sublime, and forming an insulating boundary layer of gaseous sublimed material between the source of said heat and said flame side of said element.

5. The process of protecting an element from a source of excessive heat for a limited time, said element having a flame side and a no-flame side, comprising coating said flame side with a sublimating composition having an effective temperature of sublimation, at the pressure to which the element may be exposed when the sublimating composition is utilized as a temperature control means, no higher than a predetermined maximum to which said element may be raised, subsequently applying heat to said flame side from said source, causing said sublimating composition to sublime, forming an insulating boundary layer of gaseous sublimed material between the source and said flame side and subsequently decomposing at least a part of said gas.

6. The process of protecting an element from a source of excessive heat for a limited time, said element having a flame side and a no-flame side, comprising coating said flame side with a sublimating composition having an effective temperature of sublimation, at the pressure to which the element may be exposed when the sublimating composition is utilized as a temperature control means, no higher than a predetermined maximum to which the said element may be raised, permitting the temperature of said element and said sublimating composition to equalize with the ambient temperature, subsequently applying heat from said source to said flame side, causing said sublimating composition to sublime, and forming an insulating boundary layer of gaseous sublimed material between the source of said heat and said flame side of said element.

7. The process of protecting an element from a source of excessive heat for a limited time, said element having a flame side and a no-flame side, comprising coating said flame side with a sublimating composition having an effective temperature of sublimation, at the pressure to which the element may be exposed when the sublimating composition is utilized as a temperature control means, no higher than a predetermined maximum to which said element may be raised, permitting the temperature of said sublimating composition and said element to equalize with the ambient temperature, subsequently applying heat to said flame side from said source, causing said sublimating composition to sublime, forming an insulating boundary layer of gaseous sublimed material between the source and said flame side and subsequently decomposing at least a part of said gas.

8. The process of controlling the temperature of an element one surface of which is to be exposed to flowing hot gases, comprising coating said surface with a composition comprising sufficient sublimate, having an effective temperature of sublimation at the pressure at which it is exposed to said gases, lower than the temperature of said gases, to maintain a desired temperature for a predetermined desired length of time when exposed to said gases, and sufficient of a thermosetting resinous binder to adhere said sublimate to said element, and subsequently curing said binder in situ at a temperature less than the temperature of sublimation of said sublimate.

9. The process of controlling the temperature of an element one side of which is to be exposed to flowing hot gases, comprising coating said element with a composition comprising a sublimating composition having an effective temperature of sublimation, at the pressure of said gases, below the maximum temperature to which the element can satisfactorily be raised, and a resinous binder; subsequently curing said binder in situ to form an element-reinforcing heat insulating mass; subsequently exposing the said side of said element to the flow of hot gases, subliming said sublimating composition and forming a boundary layer of gaseous sublimed material between said flowing gas and the said side of said element.

10. The process of controlling the temperature of a two sided element to be heated by direct exposure of one surface to a source of heat, comprising coating the other surface of said element with a sublimating composition in discrete, discontinuous, but closely adjacent segments said composition subliming at the temperature and pressure to which the element may be exposed to utilize the said sublimating composition as a heat control means.

11. The process of controlling the temperature, for a short, predetermined maximum length of time, of at least part of an element, formed of light metal, subjected to temperatures above 500° F., comprising applying, to the areas of said element in which the temperature is to be controlled, sublimating composition, having an effective temperature of sublimation, at the pressure to which the said element is to be exposed when it is subjected to temperatures above 500° F., below about 300° F., in an amount sufficient to ensure incomplete exhaustion of said sublimating composition during said predetermined length of time, and thereafter subjecting said parts of said element to temperatures above 500° F.

12. The process of cooling a porous element having a flame side and a no-flame side, comprising coating the no-flame side with a sublimating composition having an effective temperature of sublimation, at the pressure to which the element may be exposed when the sublimating composition is utilized as a temperature control means, lower than the maximum temperature to which the element is to be heated, heating the said element, from the flame side, to the said effective sublimating temperature, subliming at least a portion of said sublimating composition, and forcing gaseous sublimed material entirely through said porous element to the flame side.

13. The process of controlling the temperature, within a predetermined range, of an element when it is exposed to heat, comprising coating at least one surface of said element with a sublimating composition comprising sufficient of chromium trichloride and phosphorus pentoxide to give said sublimating composition an effective temperature of sublimation within said range, and, subsequently, exposing said element to a source of heat at a temperature greater than the temperature of sublimation of said sublimating composition, causing said sublimating composition to sublime.

14. A process of controlling the temperature, within a predetermined range between about 200° F. and 300° F., of an element subjected to temperatures above said range, comprising coating said element with a composition consisting essentially of molybdenum hexacarbonyl and sufficient of a binder to adhere the molybdenum hexacarbonyl to said element, and subsequently exposing said coated element to a temperature above 300° F.

15. The process of impregnating a gas-permeable porous element, of substantial thickness, with sublimate, comprising subliming said sublimate, exposing a surface of said element to the gaseous sublimate, while simultaneously inducing a pressure differential through said element, the high pressure side being at the surface exposed to the said gaseous sublimate whereby the said gaseous sublimate is forced into said element, initially maintaining said surface and a portion of the thickness of said element at a temperature higher than the sublimating temperature of the said sublimate, and, while maintaining said pressure differential, lowering the said temperature below the sublimating temperature of said sublimate.

16. A sublimating composition comprising by weight about 65 to 95 percent of a sublimating compound taken from the class consisting of chromium trichloride, mercuric sulfide, phosphorus pentoxide, ammonium chloride, molybdenum hexacarbonyl, ammonium fluoroborate, molybdenum oxide, iodine bromide, ammonium sulfite, ammonium thiosulfate, nitrogen sulfide, phosphorous pentachloride, phosphorous tetraoxide, mercurous bromide, selenium dioxide, potassium amide, mercuric sulfite, beryllium bromide and ammonium iodide, and 1.5 to 25 percent binder.

17. A composition of matter for use in a process of heat control by sublimation, consisting essentially of sufficient sublimate subliming at the pressure and temperature to which it is to be exposed in use as a temperature control means, to maintain a desired temperature for a predetermined desired length of time in use; bodying agent; conducting particles, and sufficient binder to adhere said sublimate, bodying agent and heat conducting particles to an element to be protected.

18. A sublimating composition consisting essentially of chromium trichloride, mercuric sulfide (red) and phosphorus pentoxide there being sufficient of each of said materials to provide in use an effective temperature of sublimation within a desired predetermined range.

19. A sublimating composition consisting essentially of sufficient molybdenum hexacarbonyl to maintain, in use, the temperature of an element to which it is applied, within a predetermined range of temperatures; bodying agent; heat conducting particles, and sufficient binder to adhere the molybdenum hexacarbonyl, bodying agent and heat conducting particles to an element the temperature of which is to be controlled.

20. A sublimating composition consisting essentially of sufficient ammonium fluoroborate to maintain, in use, the temperature of an element to which it is applied, within a predetermined range of temperatures; bodying agent; heat conducting particles, and sufficient binder to adhere the ammonium fluoroborate, bodying agent and heat conducting particles to an element the temperature of which is to be controlled.

21. A sublimating composition consisting essentially of sufficient molybdenum trioxide to maintain, in use, the temperature of an element to which it is applied, within a predetermined range of temperatures; bodying agent; heat conducting particles, and sufficient binder to adhere the molybdenum trioxide, bodying agent and heat conducting particles to an element the temperature of which is to be controlled.

22. A sublimating composition comprising, dry, about 65 to 80 percent by weight of molybdenum hexacarbonyl and 14 to 25 percent by weight of a binder.

23. A sublimating composition comprising by weight, dry, about 65 to 80 percent molybdenum hexacarbonyl, 14 to 25 percent binder and 1 to 10 percent of a heat conducting powder.

24. A sublimating composition comprising by weight about 65 to 80 percent molybdenum hexacarbonyl, 14 to 25 percent binder and 2 to 3 percent bodying agent.

25. A sublimating composition comprising by weight about 65 to 80 percent molybdenum hexacarbonyl, 14 to 25 percent binder, 2 to 3 percent bodying agent, and 1 to 10 percent heat-conducting powder.

26. A sublimating composition comprising, by weight, dry, about 65 to 80 percent by weight molybdenum hexacarbonyl, 14 to 25 percent by weight polymeric resinous binder, 2 percent shredded nylon and 1 to 10 percent graphite.

27. A sublimating composition comprising by weight, dry, about seventy percent ammonium fluoroborate and 25 percent binder.

28. A sublimating composition comprising by weight, dry, about 70 percent ammonium fluoroborate, 25 percent binder, and 3 percent bodying agent.

29. A sublimating composition containing by weight: molybdenum hexacarbonyl, 80 parts, resorcinol-phenol-formaldehyde resin, 14⅙ parts, paraformaldehyde with inert filler, 2⅚ parts, shredded nylon, 2 parts, graphite, 1 part, and ethyl alcohol to desired consistency.

30. A sublimating composition containing by weight: molybdenum hexacarbonyl, 65 parts, resorcinol-phenol-formaldehyde resin, 16⅔ parts, paraformaldehyde with inert filler, 3⅓ parts, shredded nylon, 2 parts, graphite or metal powder, 10 parts, bentonite, 3 parts, and ethyl alcohol to desired consistency.

31. A sublimating composition containing by weight: ammonium fluoroborate, 71 parts, phenol-formaldehyde, one-stage resin, 25 parts, shredded fiberglass, 3 parts, graphite, 1 part, and ethyl alcohol to desired consistency.

32. A sublimating composition containing by weight: $MoO_3$, 66 parts, phenol-formaldehyde, one-stage, resin, 30 parts, shredded nylon, 3 parts, graphite or metal powder, 1 part, and ethyl alcohol to desired consistency.

33. As an article of manufacture, a porous metal shape the pores of which are impregnated with sublimating composition subliming at the pressure and temperature to which the shape may be exposed to utilize the said sublimating composition as a temperature control means.

34. The article of claim 33 wherein at least one surface of said shape is provided with a coating of sublimating composition of substantial thickness.

35. An article of manufacture comprising a porous element having a flame side and a no-flame side, said element being impregnated with a sublimating composition having an effective temperature of sublimation, at the pressure to which the element may be exposed when the sublimating composition is utilized as a temperature control means, below a critical temperature of said element, the no-flame side of said porous element being coated with a sublimating composition having an effective temperature of sublimation, at said pressure, below said critical temperature.

36. The article of claim 35 wherein the coating of sublimating composition on the no-flame side of the element is coated on its out side with a substantially gas-impervious coating.

37. An article of manufacture comprising a porous element having a flame side and a no-flame side, said element being impregnated with a sublimating composition having an effective temperature of sublimation, at the pressure to which the element may be exposed when the sublimating composition is utilized as a temperature control means, below a critical temperature of said element, the no-flame side of said porous element being coated with a substantially gas-impervious coating.

38. An article of manufacture, comprising a base element and a sheet of porous material, the pores of which are impregnated with sublimating composition subliming at the pressure and temperature to which the article may be exposed to utilize the said sublimating composition as a heat control means, said sheet being laminated with said base element.

39. As an element of aircraft exposed to a stream of heated gas, a structural member of a material of adequate strength at normal temperature but inadequate strength at the maximum temperature of said gas, said member being coated with a sublimating composition having an effective temperature of sublimation, at the pressure of said gas, below the temperature at which the strength of said member is inadequate and being present in an amount sufficient to sublime at the said maximum temperature of said gas for a predetermined time period through which said element must maintain its strength.

References Cited in the file of this patent

UNITED STATES PATENTS

| 1,497,417 | Weber | June 10, 1924 |
| 2,219,005 | Daeves et al. | Oct. 22, 1940 |
| 2,361,156 | Thompson et al. | Oct. 24, 1944 |
| 2,363,555 | Saslaw | Nov. 28, 1944 |

OTHER REFERENCES

Threading With Carbon Dioxide Coolant, Machinery, vol. 84, April 2, 1954, pp. 695–698.